US009203104B2

(12) United States Patent
Kwon et al.

(10) Patent No.: US 9,203,104 B2
(45) Date of Patent: Dec. 1, 2015

(54) ELECTRODE FOR SECONDARY BATTERY, PREPARATION THEREOF, AND SECONDARY BATTERY AND CABLE-TYPE SECONDARY BATTERY COMPRISING THE SAME

(71) Applicant: LG Chem, Ltd., Seoul (KR)

(72) Inventors: Yo-Han Kwon, Daejeon (KR); Hye-Ran Jung, Daejeon (KR); Eun-Kyung Kim, Daejeon (KR); Je-Young Kim, Daejeon (KR); Hyo-Mi Kim, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 14/472,635

(22) Filed: Aug. 29, 2014

(65) Prior Publication Data

US 2014/0370349 A1 Dec. 18, 2014

Related U.S. Application Data

(63) Continuation of application No. PCT/KR2014/004044, filed on May 7, 2014.

(30) Foreign Application Priority Data

May 7, 2013 (KR) .......................... 10-2013-0051563
May 7, 2014 (KR) .......................... 10-2014-0054277

(51) Int. Cl.
*H01M 4/02* (2006.01)
*H01M 10/04* (2006.01)
(Continued)

(52) U.S. Cl.
CPC .......... *H01M 10/0422* (2013.01); *H01M 4/043* (2013.01); *H01M 4/0404* (2013.01);
(Continued)

(58) Field of Classification Search
CPC ..................................................... H01M 4/668
USPC ............................................................ 429/94
See application file for complete search history.

(56) References Cited

U.S. PATENT DOCUMENTS 3,079,456 A 2/1963 Pawlak
4,522,897 A 6/1985 Walsh
(Continued)

FOREIGN PATENT DOCUMENTS

JP H07220759 A 8/1995
JP 11297360 10/1999
(Continued)

OTHER PUBLICATIONS

International Search Report for Application No. PCT/KR2014/004039 dated Sep. 11, 2014.
(Continued)

*Primary Examiner* — Basia Ridley
*Assistant Examiner* — James Erwin
(74) *Attorney, Agent, or Firm* — Lerner, David, Littenberg, Krumholz & Mentlik, LLP

(57) ABSTRACT

The present disclosure provides a sheet-form electrode for a secondary battery, comprising a current collector; an electrode active material layer formed on one surface of the current collector; and a first porous supporting layer formed on the electrode active material layer. The sheet-form electrode for a secondary battery according to the present disclosure has supporting layers on at least one surface thereof to exhibit surprisingly improved flexibility and prevent the release of the electrode active material layer from a current collector even if intense external forces are applied to the electrode, thereby preventing the decrease of battery capacity and improving the cycle life characteristic of the battery.

30 Claims, 5 Drawing Sheets

(51) Int. Cl.

| | |
|---|---|
| *H01M 4/66* | (2006.01) |
| *H01M 10/052* | (2010.01) |
| *H01M 10/058* | (2010.01) |
| *H01M 10/0525* | (2010.01) |
| *H01M 4/38* | (2006.01) |
| *H01M 4/44* | (2006.01) |
| *H01M 4/46* | (2006.01) |
| *H01M 4/485* | (2010.01) |
| *H01M 4/52* | (2010.01) |
| *H01M 4/525* | (2010.01) |
| *H01M 4/58* | (2010.01) |
| *H01M 4/587* | (2010.01) |
| *H01M 4/04* | (2006.01) |
| *H01M 4/131* | (2010.01) |
| *H01M 4/133* | (2010.01) |
| *H01M 4/134* | (2010.01) |
| *H01M 4/139* | (2010.01) |
| *H01M 4/62* | (2006.01) |
| *H01M 4/70* | (2006.01) |
| *H01M 4/74* | (2006.01) |

(52) U.S. Cl.
CPC .............. *H01M 4/131* (2013.01); *H01M 4/133* (2013.01); *H01M 4/134* (2013.01); *H01M 4/139* (2013.01); *H01M 4/381* (2013.01); *H01M 4/382* (2013.01); *H01M 4/386* (2013.01); *H01M 4/44* (2013.01); *H01M 4/46* (2013.01); *H01M 4/485* (2013.01); *H01M 4/523* (2013.01); *H01M 4/525* (2013.01); *H01M 4/581* (2013.01); *H01M 4/587* (2013.01); *H01M 4/622* (2013.01); *H01M 4/625* (2013.01); *H01M 4/66* (2013.01); *H01M 4/661* (2013.01); *H01M 4/662* (2013.01); *H01M 4/663* (2013.01); *H01M 4/668* (2013.01); *H01M 10/0431* (2013.01); *H01M 10/052* (2013.01); *H01M 10/058* (2013.01); *H01M 10/0525* (2013.01); *H01M 4/667* (2013.01); *H01M 4/70* (2013.01); *H01M 4/747* (2013.01); *Y02E 60/122* (2013.01); *Y02T 10/7011* (2013.01)

(56) References Cited

U.S. PATENT DOCUMENTS

| | | | |
|---|---|---|---|
| 5,008,165 A | 4/1991 | Schmode | |
| 5,077,153 A | 12/1991 | Grange-Cossou et al. | |
| 5,478,676 A | 12/1995 | Turi et al. | |
| 6,165,645 A | 12/2000 | Nishimura et al. | |
| 6,280,879 B1* | 8/2001 | Andersen et al. | 429/233 |
| 6,399,253 B1 | 6/2002 | Chang et al. | |
| 6,403,263 B1* | 6/2002 | Roach | 429/233 |
| 6,723,467 B2 | 4/2004 | Yoshida et al. | |
| 7,682,740 B2 | 3/2010 | Yong et al. | |
| 8,895,189 B2 | 11/2014 | Zhamu et al. | |
| 8,945,752 B2 | 2/2015 | Kwon et al. | |
| 2001/0053475 A1 | 12/2001 | Ying et al. | |
| 2003/0215716 A1 | 11/2003 | Suzuki et al. | |
| 2005/0069774 A1 | 3/2005 | Miyazaki et al. | |
| 2005/0112461 A1 | 5/2005 | Amine et al. | |
| 2005/0118508 A1 | 6/2005 | Yong et al. | |
| 2005/0155216 A1 | 7/2005 | Cho et al. | |
| 2006/0008702 A1 | 1/2006 | Cheon et al. | |
| 2006/0110661 A1 | 5/2006 | Lee et al. | |
| 2006/0199294 A1* | 9/2006 | Fujikawa et al. | 438/42 |
| 2007/0207379 A1 | 9/2007 | Hatta et al. | |
| 2007/0231682 A1 | 10/2007 | Aoyama et al. | |
| 2008/0032170 A1 | 2/2008 | Wainright et al. | |
| 2008/0089006 A1* | 4/2008 | Zhong et al. | 361/303 |
| 2009/0047575 A1 | 2/2009 | Abe et al. | |
| 2009/0107746 A1 | 4/2009 | Horie et al. | |
| 2010/0216016 A1 | 8/2010 | Seino et al. | |
| 2010/0261065 A1 | 10/2010 | Babinec et al. | |
| 2010/0273051 A1 | 10/2010 | Choi et al. | |
| 2010/0273056 A1 | 10/2010 | Kanda et al. | |
| 2010/0285341 A1 | 11/2010 | Yun et al. | |
| 2010/0291442 A1 | 11/2010 | Wang et al. | |
| 2010/0316898 A1 | 12/2010 | Howard et al. | |
| 2011/0039140 A1 | 2/2011 | Miyahisa et al. | |
| 2011/0068001 A1 | 3/2011 | Affinito et al. | |
| 2011/0111277 A1 | 5/2011 | Bessho et al. | |
| 2011/0223470 A1 | 9/2011 | Tomantschger | |
| 2012/0009331 A1 | 1/2012 | Kwon et al. | |
| 2012/0034509 A1 | 2/2012 | Bae et al. | |
| 2012/0040231 A1 | 2/2012 | Hagiwara et al. | |
| 2012/0040235 A1 | 2/2012 | Cho et al. | |
| 2012/0077109 A1 | 3/2012 | Hong et al. | |
| 2012/0100412 A1 | 4/2012 | Kwon et al. | |
| 2012/0107658 A1 | 5/2012 | Kwon et al. | |
| 2012/0115040 A1 | 5/2012 | Kwon et al. | |
| 2012/0115259 A1 | 5/2012 | Lee et al. | |
| 2012/0141877 A1 | 6/2012 | Choi et al. | |
| 2012/0148902 A1 | 6/2012 | Kwon et al. | |
| 2012/0174386 A1 | 7/2012 | Katayama et al. | |
| 2012/0189914 A1* | 7/2012 | Hara et al. | 429/211 |
| 2012/0295144 A1 | 11/2012 | Kwon et al. | |
| 2012/0308863 A1* | 12/2012 | Masumoto | H01M 2/022 429/94 |
| 2013/0011742 A1* | 1/2013 | Park et al. | 429/234 |
| 2013/0089774 A1* | 4/2013 | Chami | 429/158 |
| 2013/0143126 A1 | 6/2013 | Jung et al. | |
| 2013/0288150 A1 | 10/2013 | Hodges et al. | |
| 2013/0344363 A1 | 12/2013 | Upadhyaya | |
| 2013/0344368 A1 | 12/2013 | Kwon et al. | |
| 2014/0011065 A1 | 1/2014 | Kwon et al. | |
| 2014/0030569 A1 | 1/2014 | Kwon et al. | |
| 2014/0170454 A1 | 6/2014 | Kwon et al. | |
| 2014/0178726 A1 | 6/2014 | Kwon et al. | |
| 2014/0186672 A1 | 7/2014 | Kwon et al. | |
| 2014/0186673 A1 | 7/2014 | Kwon et al. | |
| 2014/0212720 A1 | 7/2014 | Kwon et al. | |
| 2014/0234681 A1 | 8/2014 | Kwon et al. | |
| 2014/0370351 A1 | 12/2014 | Kwon et al. | |

FOREIGN PATENT DOCUMENTS

| | | |
|---|---|---|
| JP | 2000311693 A | 11/2000 |
| JP | 2005038612 A | 2/2005 |
| JP | 2007265989 A | 10/2007 |
| JP | 2009064767 A | 3/2009 |
| JP | 2011054502 A | 3/2011 |
| JP | 2011192620 A | 9/2011 |
| JP | 2013020410 A | 1/2013 |
| KR | 20050043674 A | 5/2005 |
| KR | 20050075811 A | 7/2005 |
| KR | 100582557 B1 | 5/2006 |
| KR | 2008-0005627 A | 1/2008 |
| KR | 20080010166 A | 1/2008 |
| KR | 20080015373 A | 2/2008 |
| KR | 100918751 B1 | 9/2009 |
| KR | 20100117403 A | 11/2010 |
| KR | 20100130818 A | 12/2010 |
| KR | 2011-0038038 A | 4/2011 |
| KR | 20110136448 A | 12/2011 |
| KR | 20120000708 A | 1/2012 |
| KR | 2012-0014542 A | 2/2012 |
| KR | 20120094871 A | 8/2012 |
| KR | 2012-0103515 A | 9/2012 |
| KR | 2013-0040160 A | 4/2013 |
| KR | 20130040166 A | 4/2013 |
| KR | 2013-0045219 A | 5/2013 |
| WO | 2005098994 A1 | 10/2005 |
| WO | 2011159083 A2 | 12/2011 |
| WO | 2012088643 A1 | 7/2012 |

OTHER PUBLICATIONS

International Search Report for Application No. PCT/KR2014/004042 dated Sep. 11, 2014.

(56) References Cited

OTHER PUBLICATIONS

International Search Report for Application No. PCT/KR2014/004043 dated Sep. 11, 2014.
International Search Report for Application No. PCT/KR2014/004044 dated Oct. 1, 2014.
International Search Report for Application No. PCT/KR2014/004046 dated Oct. 1, 2014.
International Search Report for Application No. PCT/KR2014/004048 dated Sep. 12, 2014.
International Search Report from PCT/KR2014/003737, dated Aug. 14, 2014.
International Search Report from PCT/KR2014/004047, dated Sep. 3, 2014.
Machine English Translation of JP 2005-038612.
Original Japanese text of JP 2005-038612.
U.S. Appl. No. 14/445,144, filed Jul. 29, 2014.
U.S. Appl. No. 14/472,692, filed Aug. 29, 2014.
U.S. Appl. No. 14/477,305, filed Sep. 4, 2014.
U.S. Appl. No. 14/477,317, filed Sep. 4, 2014.
U.S. Appl. No. 14/479,713, filed Sep. 8, 2014.
U.S. Appl. No. 14/479,821, filed Sep. 8, 2014.
U.S. Appl. No. 14/479,856, filed Sep. 8, 2014.
U.S. Appl. No. 14/480,914, filed Sep. 9, 2014.
U.S. Appl. No. 14/480,919, filed Sep. 9, 2014.
U.S. Appl. No. 14/480,926, filed Sep. 9, 2014.
U.S. Appl. No. 14/483,318, filed Sep. 11, 2014.
U.S. Appl. No. 14/483,328, filed Sep. 11, 2014.
U.S. Appl. No. 14/483,348, filed Sep. 11, 2014.
U.S. Appl. No. 14/483,373, filed Sep. 11, 2014.
U.S. Appl. No. 14/484,401, filed Sep. 12, 2014.
U.S. Appl. No. 14/484,454, filed Sep. 12, 2014.
U.S. Appl. No. 14/484,463, filed Sep. 12, 2014.
U.S. Appl. No. 14/484,472, filed Sep. 12, 2014.
U.S. Appl. No. 14/484,487, filed Sep. 12, 2014.
Y.H. Kwon, S.-W. Woo, H.-R. Jung, H.K. Yu, K. Kim, B.H. Oh, S. Ahn, S.-Y. Lee, S.-Wan Song, J. Cho, H.-C. Shin, J. Y. Kim, Cable-Type Flexible Lithium Ion Battery Based on Hollow Multi-Helix Electrodes, Adv. Mater. 2012, 24, 5192-5197.
http://www.merriam-webster.com/dictionary/laminate.

* cited by examiner

ELECTRODE FOR SECONDARY BATTERY, PREPARATION THEREOF, AND SECONDARY BATTERY AND CABLE-TYPE SECONDARY BATTERY COMPRISING THE SAME

CROSS-REFERENCE TO RELATED APPLICATION

This application is a continuation of International Application No. PCT/KR2014/004044 filed on May 7, 2014, which claims priority under 35 USC 119(a) to Korean Patent Application No. 10-2013-0051563 filed in the Republic of Korea on May 7, 2013, and Korean Patent Application No. 10-2014-0054277 filed in the Republic of Korea on May 7, 2014, the disclosure of which is incorporated herein by reference.

TECHNICAL FIELD

The present disclosure relates to an electrode for a secondary battery, more specifically to an electrode for a secondary battery which can be prevented from the release of an electrode active material layer and have improved flexibility, a method of preparing the electrode, and a secondary battery and a cable-type secondary battery comprising the electrode.

BACKGROUND ART

Secondary batteries are devices capable of storing energy in chemical form and of converting into electrical energy to generate electricity when needed. The secondary batteries are also referred to as rechargeable batteries because they can be recharged repeatedly. Common secondary batteries include lead accumulators, NiCd batteries, NiMH accumulators, Li-ion batteries, Li-ion polymer batteries, and the like. When compared with disposable primary batteries, not only are the secondary batteries more economically efficient, they are also more environmentally friendly.

Secondary batteries are currently used in applications requiring low electric power, for example, equipment to start vehicles, mobile devices, tools, uninterruptible power supplies, and the like. Recently, as the development of wireless communication technologies has been leading to the popularization of mobile devices and even to the mobilization of many kinds of conventional devices, the demand for secondary batteries has been dramatically increasing. Secondary batteries are also used in environmentally friendly next-generation vehicles such as hybrid vehicles and electric vehicles to reduce the costs and weight and to increase the service life of the vehicles.

Generally, secondary batteries have a cylindrical, prismatic, or pouch shape. This is associated with a fabrication process of the secondary batteries in which an electrode assembly composed of an anode, a cathode, and a separator is mounted in a cylindrical or prismatic metal casing or a pouch-shaped casing of an aluminum laminate sheet, and in which the casing is filled with electrolyte. Because a predetermined mounting space for the electrode assembly is necessary in this process, the cylindrical, prismatic or pouch shape of the secondary batteries is a limitation in developing various shapes of mobile devices. Accordingly, there is a need for secondary batteries of a new structure that are easily adaptable in shape.

To fulfill this need, suggestions have been made to develop cable-type batteries having a very high ratio of length to cross-sectional diameter. The cable-type batteries are easy in shape variation, while being subject to stress due to external force for the shape variation. Also, the electrode active material layer of cable-type batteries may be released by rapid volume expansion during charging and discharging processes. From these reasons, the capacity of the batteries may be reduced and the cycle life characteristics thereof may be deteriorated.

Such a problem may be solved in a certain degree by increasing the amount of a binder used in the electrode active material layer to provide flexibility during bending or twisting. However, the increase of a binder amount in the electrode active material layer causes an electrode resistance rise to deteriorate battery performances. Also, when intense external forces are applied, for example, in the case that electrodes are completely folded, the release of the electrode active material layer cannot be prevented even though the amount of a binder becomes increased. Therefore, this method is insufficient to solve such problems.

SUMMARY OF THE DISCLOSURE

The present disclosure is designed to solve the problems of the related art, and therefore the present disclosure is directed to providing an electrode for a secondary battery which can be mitigated from crack generation in an electrode active material layer by external forces, and also can be prevented from the release of the electrode active material layer from a current collector even if severe cracks are present, a method of preparing the electrode, and a secondary battery and a cable-type secondary battery comprising the electrode.

In accordance with one aspect of the present disclosure, there is provided a sheet-form electrode for a secondary battery, comprising a current collector; an electrode active material layer formed on one surface of the current collector; and a first porous supporting layer formed on the electrode active material layer.

The current collector may be made of stainless steel, aluminum, nickel, titanium, sintered carbon, or copper; stainless steel treated with carbon, nickel, titanium or silver on the surface thereof; an aluminum-cadmium alloy; a non-conductive polymer treated with a conductive material on the surface thereof; a conductive polymer; a metal paste comprising metal powders of Ni, Al, Au, Ag, Pd/Ag, Cr, Ta, Cu, Ba or ITO; or a carbon paste comprising carbon powders of graphite, carbon black or carbon nanotube.

Also, the current collector may be in the form of a mesh.

In addition, the current collector may further comprise a primer coating layer consisting of a conductive material and a binder.

The conductive material may comprise any one selected from the group consisting of carbon black, acetylene black, ketjen black, carbon fiber, carbon nanotube, graphene and a mixture thereof.

The binder may be selected from the group consisting of polyvinylidene fluoride (PVDF), polyvinylidene fluoride-co-hexafluoro propylene, polyvinylidene fluoride-co-trichloro-ethylene, polybutyl acrylate, polymethyl methacrylate, polyacrylonitrile, polyvinylpyrrolidone, polyvinylacetate, polyethylene-co-vinyl acetate, polyethylene oxide, polyarylate, cellulose acetate, cellulose acetate butyrate, cellulose acetate propionate, cyanoethylpullulan, cyanoethylpolyvinylalcohol, cyanoethylcellulose, cyanoethylsucrose, pullulan, carboxyl methyl cellulose, styrene-butadiene rubber, acrylonitrile-styrene-butadiene copolymer, polyimide and a mixture thereof.

Further, the current collector may have a plurality of recesses which are continuously patterned or intermittently patterned, on at least one surface thereof.

Meanwhile, the first supporting layer may be a mesh-form porous membrane or a non-woven fabric.

The first supporting layer may be made of any one selected from the group consisting of high-density polyethylene, low-density polyethylene, linear low-density polyethylene, ultrahigh molecular weight polyethylene, polypropylene, polyethylene terephthalate, polybutylene terephthalate, polyester, polyacetal, polyamide, polycarbonate, polyimide, polyetheretherketone, polyethersulfone, polyphenylene oxide, polyphenylene sulfide, polyethylene naphthalate, and a mixture thereof.

Also, the first supporting layer may further comprise a conductive material-coating layer having a conductive material and a binder thereon.

In the conductive material-coating layer, the conductive material and the binder may be present in a weight ratio of 80:20 to 99:1.

The conductive material may comprise any one selected from the group consisting of carbon black, acetylene black, ketjen black, carbon fiber, carbon nanotube, graphene and a mixture thereof.

The binder may be selected from the group consisting of polyvinylidene fluoride (PVDF), polyvinylidene fluoride-co-hexafluoro propylene, polyvinylidene fluoride-co-trichloroethylene, polybutyl acrylate, polymethyl methacrylate, polyacrylonitrile, polyvinylpyrrolidone, polyvinylacetate, polyethylene-co-vinyl acetate, polyethylene oxide, polyarylate, cellulose acetate, cellulose acetate butyrate, cellulose acetate propionate, cyanoethylpullulan, cyanoethylpolyvinylalcohol, cyanoethylcellulose, cyanoethylsucrose, pullulan, carboxyl methyl cellulose, styrene-butadiene rubber, acrylonitrile-styrene-butadiene copolymer, polyimide and a mixture thereof.

In addition, the first supporting layer may further comprise a porous coating layer comprising a mixture of inorganic particles and a binder polymer thereon.

Meanwhile, the sheet-form electrode may further comprise a second supporting layer on another surface of the current collector.

The second supporting layer may be a polymer film which may be made of any one selected from the group consisting of polyolefin, polyester, polyimide, polyamide and a mixture thereof.

When the electrode for a secondary battery is used as an anode, the electrode active material layer may comprise an active material selected from the group consisting of natural graphite, artificial graphite, or carbonaceous material; lithium-titanium complex oxide (LTO), and metals (Me) including Si, Sn, Li, Zn, Mg, Cd, Ce, Ni and Fe; alloys of the metals; an oxide (MeOx) of the metals; a complex of the metals and carbon; and a mixture thereof, and when the electrode for a secondary battery is used as a cathode, the electrode active material layer may comprise an active material selected from the group consisting of $LiCoO_2$, $LiNiO_2$, $LiMn_2O_4$, $LiCoPO_4$, $LiFePO_4$, $LiNiMnCoO_2$, $LiNi_{1-x-y-z}Co_xM1_yM2_zO_2$ (wherein M1 and M2 are each independently selected from the group consisting of Al, Ni, Co, Fe, Mn, V, Cr, Ti, W, Ta, Mg and Mo, and x, y and z are each independently an atomic fraction of oxide-forming elements, in which $0 \leq x < 0.5$, $0 \leq y < 0.5$, $0 \leq z < 0.5$, and $x+y+z \leq 1$), and a mixture thereof.

In accordance with another aspect of the present disclosure, there is provided a method of preparing a sheet-form electrode for a secondary battery, comprising (S1) applying a slurry containing an electrode active material on one surface of a current collector, (S2) forming a first porous supporting layer on the applied electrode active material slurry; and (S3) compressing the resultant obtained in step (S2) to form an electrode active material layer which is adhered between the current collector and the first porous supporting layer to be integrated with each other.

The electrode active material slurry may comprise a binder.

In the step of (S2), before the binder is cured, the first porous supporting layer may be formed on the applied electrode active material slurry.

In the step of (S3), before the binder is cured, the resultant obtained in step (S2) is compressed by a coating blade to form an electrode active material layer which is adhered between the current collector and the first porous supporting layer to be integrated with each other.

Also, before the step of (S1) or after the step of (S3), a second supporting layer may be further formed on another surface of the current collector by compression.

Also, in accordance with yet another aspect of the present disclosure, there is provided a secondary battery comprising a cathode, an anode, a separator interposed between the cathode and the anode, and a non-aqueous electrolyte solution, wherein at least one of the cathode and the anode is the above-mentioned electrode for a secondary battery according to the present disclosure.

In addition, in accordance with yet still another aspect of the present disclosure, there is provided a cable-type secondary battery, comprising: an inner electrode; a separation layer surrounding the outer surface of the inner electrode to prevent a short circuit between electrodes; and an outer electrode spirally wound to surround the outer surface of the separation layer, wherein at least one of the inner electrode and the outer anode is formed from the above-mentioned electrode for a secondary battery according to the present disclosure.

The outer electrode may be in the form of a uniaxially extended strip.

The outer electrode may be spirally wound so that it is not overlapped in its width or overlapped in its width.

The inner electrode may be a hollow structure whose central part is empty.

The inner electrode may comprise one or more electrodes for a secondary battery, the electrodes being spirally wound.

Also, the inner electrode may be provided with a core of inner current collector, a core for supplying lithium ions, which comprises an electrolyte, or a filling core therein.

The core for supplying lithium ions may further comprise a gel polymer electrolyte and a support, or may further comprise a liquid electrolyte and a porous carrier.

The electrolyte which is used in the core for supplying lithium ions may be selected from a non-aqueous electrolyte solution using ethylene carbonate (EC), propylene carbonate (PC), butylenes carbonate (BC), vinylene carbonate (VC), diethyl carbonate (DEC), dimethyl carbonate (DMC), ethyl methyl carbonate (EMC), methyl formate (MF), γ-butyrolactone (γ-BL), sulfolane, methyl acetate (MA) or methyl propionate (MP); a gel polymer electrolyte using PEO, PVdF, PVdF-HFP, PMMA, PAN, or PVAc; and a solid electrolyte using PEO, polypropylene oxide (PPO), polyether imine (PEI), polyethylene sulphide (PES), or polyvinyl acetate (PVAc).

The electrolyte may further comprise a lithium salt which may be selected from LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium chloroborate, lower aliphatic lithium carbonate, lithium tetraphenylborate, and a mixture thereof.

The inner electrode may be an anode or a cathode, and the outer electrode may be a cathode or an anode corresponding to the inner electrode.

Meanwhile, the separation layer may be an electrolyte layer or a separator.

The electrolyte layer may comprise an electrolyte selected from a gel polymer electrolyte using PEO, PVdF, PMMA, PVdF-HFP, PAN, or PVAc; and a solid electrolyte using PEO, polypropylene oxide (PPO), polyether imine (PEI), polyethylene sulphide (PES), or polyvinyl acetate (PVAc).

The electrolyte layer may further comprise a lithium salt, which may be selected from the group consisting of LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, CF$_3$SO$_3$Li, (CF$_3$SO$_2$)$_2$NLi, lithium chloroborate, lower aliphatic lithium carbonate, lithium tetraphenylborate, and a mixture thereof.

The separator may be a porous polymer substrate made of a polyolefin-based polymer selected from the group consisting of ethylene homopolymers, propylene homopolymers, ethylene-butene copolymers, ethylene-hexene copolymers, and ethylene-methacrylate copolymers; a porous polymer substrate made of a polymer selected from the group consisting of polyesters, polyacetals, polyamides, polycarbonates, polyimides, polyether ether ketones, polyether sulfones, polyphenylene oxides, polyphenylene sulfides and polyethylene naphthalates; a porous substrate made of a mixture of inorganic particles and a binder polymer; or a separator having a porous coating layer formed on at least one surface of the porous polymer substrate and comprising inorganic particles and a binder polymer.

Further, in accordance with yet still another aspect of the present invention, there is provided a cable-type secondary battery, comprising: a core for supplying lithium ions, which comprise an electrolyte; an inner electrode surrounding the outer surface of the core for supplying lithium ions and comprising a current collector and an electrode active material layer; a separation layer surrounding the outer surface of the inner electrode to prevent a short circuit between electrodes; and an outer electrode spirally wound to surround the outer surface of the separation layer and comprising a current collector and an electrode active material layer, wherein at least one of the inner electrode and the outer anode is formed from the above-mentioned electrode for a secondary battery according to the present disclosure. Furthermore, in accordance with yet still another aspect of the present invention, there is provided a cable-type secondary battery, comprising: two or more inner electrodes arranged in parallel to each other; a separation layer surrounding the outer surface of the inner electrodes to prevent a short circuit between electrodes; and an outer electrode spirally wound to surround the outer surface of the separation layer, wherein at least one of the inner electrode and the outer anode is formed from the above-mentioned electrode for a secondary battery according to the present disclosure.

Further, in accordance with yet still another aspect of the present invention, there is provided a cable-type secondary battery, comprising: two or more cores for supplying lithium ions, which comprise an electrolyte; two or more inner electrodes arranged in parallel to each other, each inner electrode surrounding the outer surface of each core for supplying lithium ions and comprising a current collector and an electrode active material layer; a separation layer surrounding the outer surface of the inner electrodes to prevent a short circuit between electrodes; and an outer electrode spirally wound to surround the outer surface of the separation layer and comprising a current collector and an electrode active material layer, wherein at least one of the inner electrode and the outer anode is formed from the above-mentioned electrode for a secondary battery according to the present disclosure.

The inner electrode may comprise one or more electrodes for a secondary battery, the electrodes being spirally wound.

Thus, the sheet-form electrode for a secondary battery according to the present disclosure has supporting layers on at least one surface thereof to exhibit surprisingly improved flexibility.

The supporting layers act as a buffer when intense external forces are applied to the electrode, e.g., during the complete folding of the electrode, to reduce crack generation in an electrode active material layer even though the amount of a binder in the electrode active material layer is not raised. Thereby, the release of the electrode active material layer from a current collector can be prevented.

Accordingly, the sheet-form electrode can prevent a decrease in battery capacity and can improve the cycle life characteristic of batteries.

Also, the sheet-form electrode has a porous supporting layer to allow good introduction of an electrolyte solution in an electrode active material layer, and also the electrolyte solution can be impregnated into the pores of the porous supporting layer to inhibit a resistance rise in the battery, thereby preventing the deterioration of battery performances.

BRIEF DESCRIPTION OF THE DRAWINGS

Other objects and aspects of the present disclosure will become apparent from the following descriptions of the embodiments with reference to the accompanying drawings in which.

EXPLANATION OF REFERENCE NUMERALS

| | |
|---|---|
| 10: | Current collector |
| 20: | Electrode active material layer |
| 20': | Electrode active material-containing slurry |
| 30: | First supporting layer |
| 40: | Second supporting layer |
| 50: | Coating blade |
| 100, 200: | Cable-type secondary battery |
| 110, 210: | Core for supplying lithium ions |
| 120, 220: | Inner current collector |
| 130, 230: | Inner electrode active material layer |
| 140, 240: | First supporting layer |
| 150, 250: | Second supporting layer |
| 160, 260: | Separation layer |
| 170, 270: | Outer electrode active material layer |
| 180, 280: | Outer current collector |
| 190, 290: | Protection coating |

DESCRIPTION OF THE PREFERRED EMBODIMENT

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the spirit and scope of the disclosure.

Figure 1:
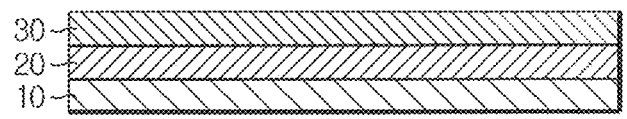
FIG. 1 shows a cross-section of a sheet-form electrode for a secondary battery according to one embodiment of the present disclosure.
Figure 2:
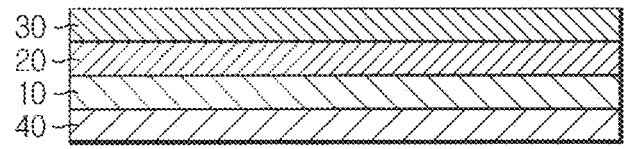
FIG. 2 shows a cross-section of a sheet-form electrode for a secondary battery according to another embodiment of the present disclosure.
Figure 3:
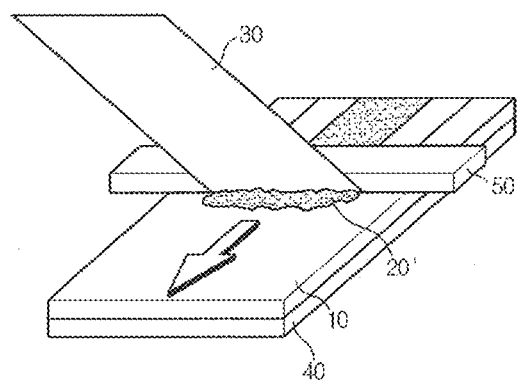
FIG. 3 schematically shows a method of preparing a sheet-form electrode for a secondary battery according to one embodiment of the present disclosure.

FIGS. 1 and 2 show a cross-section of a sheet-form electrode for a secondary battery according to one embodiment of the present disclosure, and FIG. 3 schematically shows a preferred method of preparing a sheet-form electrode for a secondary battery according to one embodiment of the present disclosure.

Referring FIGS. 1 to 3, a sheet-form electrode for a secondary battery according to the present disclosure comprises a current collector 10; an electrode active material layer 20 formed on one surface of the current collector 10; and a first porous supporting layer 30 formed on the electrode active material layer 20.

The sheet-form electrode may further comprise a second supporting layer 40 formed on another surface of the current collector 10.

In order for a battery to have flexibility, electrodes used in the battery should have sufficient flexibility. However, in the case of conventional cable-type batteries being one example of flexible batteries, an electrode active material layer is apt to be released by stress due to external force for the shape variation, or by its rapid volume expansion during charging and discharging processes when a high-capacity anode active material containing Si, Sn or the like is used. Such a release of the electrode active material layer reduces battery capacity and deteriorates cycle life characteristics. As an attempt for overcoming this problem, the amount of a binder in the electrode active material layer has been raised to provide flexibility during bending or twisting.

However, the increase of a binder amount in the electrode active material layer causes an electrode resistance rise to deteriorate battery performances. Also, when intense external forces are applied, for example, in the case that electrodes are completely folded, the release of the electrode active material layer cannot be prevented even though the amount of a binder becomes increased. Therefore, this method is insufficient to solve such problems.

For the purpose of overcoming the above-mentioned problems, the present inventors have designed the electrode for a secondary battery in the form of a sheet by comprising the first supporting layer 30 formed on the top surface of the electrode active material layer 20 and the second supporting layer 40 which may be further formed on another surface of the current collector 10.

That is, even if the electrode is applied by external forces during bending or twisting, the first supporting layer 30 having porosity acts as a buffer capable of mitigating the external forces applied to the electrode active material layer 20, to prevent the release of the electrode active material layer 20, thereby improving the flexibility of the electrode. Also, the second supporting layer 40 which may be further formed can inhibit a short circuit of the current collector 10, thereby more improving the flexibility of the electrode.

Hereinafter, a method of preparing the electrode for a secondary battery will be explained with reference to FIGS. 1 to 3. Although FIG. 3 shows that an electrode active material layer is formed after the second supporting layer 40 is preformed, this case is just one embodiment of the present disclosure. As will be described below, an electrode active material layer may be formed before the second supporting layer 40 is formed.

First, a slurry (20') containing an electrode active material is applied on one surface of a current collector 10 (S1).

The current collector 10 may be made of stainless steel, aluminum, nickel, titanium, sintered carbon, or copper, stainless steel treated with carbon, nickel, titanium or silver on the surface thereof; an aluminum-cadmium alloy; a non-conductive polymer treated with a conductive material on the surface thereof; a conductive polymer; a metal paste comprising metal powders of Ni, Al, Au, Ag, Pd/Ag, Cr, Ta, Cu, Ba or ITO; or a carbon paste comprising carbon powders of graphite, carbon black or carbon nanotube.

As mentioned above, when secondary batteries are subject to external forces by bending or twisting, an electrode active material layer may be released from a current collector. For this reason, large amounts of binder components are used in the electrode active material layer so as to provide flexibility in electrodes. However, large amounts of binder may be easily peeled off owing to swelling by an electrolyte solution, thereby deteriorating battery performances.

Accordingly, for the purpose of improving adhesiveness between an electrode active material layer and a current collector, the current collector 10 may further comprise a primer coating layer consisting of a conductive material and a binder. The conductive material and the binder used in the primer coating layer may be the same as those used in the formation of a conductive material-coating layer, which will be described below.

Figure 4:
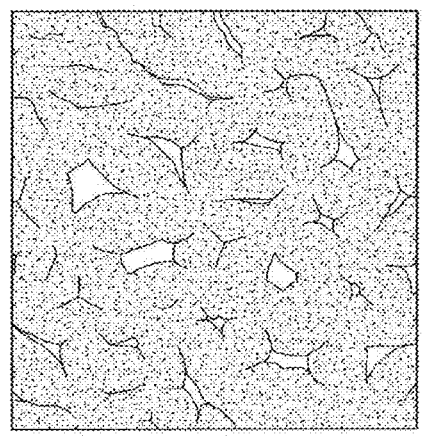
FIG. 4 shows a surface of a mesh-form current collector according to one embodiment of the present disclosure.
Figure 5:
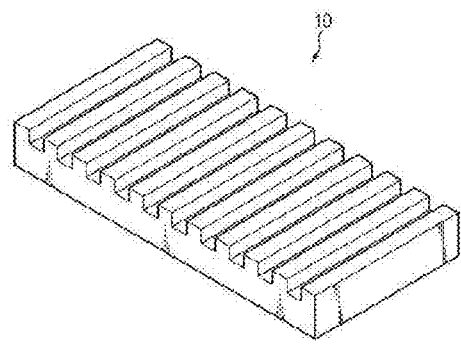
FIG. 5 schematically shows a surface of a current collector having a plurality of recesses, according to one embodiment of the present disclosure.
Figure 6:
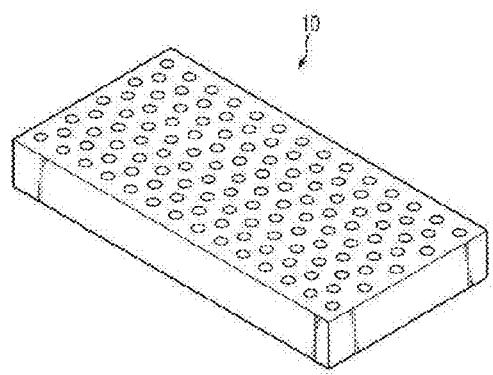
FIG. 6 schematically shows a surface of a current collector having a plurality of recesses, according to another embodiment of the present disclosure.

Also, referring to FIGS. 4 to 6, the current collector 10 may be in the form of a mesh, and may have a plurality of recesses on at least one surface thereof so as to more increase its surface area. The recesses may be continuously patterned or intermittently patterned. That is, continuous patterned recesses may be formed with spacing apart with each other in the longitudinal direction, or a plurality of holes may be formed in the form of intermittent patterns. The plurality of holes may be a circular or polygonal shape.

Subsequently, a first porous supporting layer 30 is formed on the applied electrode active material slurry (20').

The first supporting layer 30 may be a mesh-form porous membrane or a non-woven fabric. Such a porous structure allows good introduction of an electrolyte solution in the electrode active material layer 20, and also the first supporting layer 30 itself has superior impregnation of the electrolyte solution to provide good ionic conductivity, thereby preventing an electrode resistance rise and eventually preventing the deterioration of battery performances.

The first supporting layer 30 may be made of any one selected from the group consisting of high-density polyethylene, low-density polyethylene, linear low-density polyethylene, ultra-high molecular weight polyethylene, polypropylene, polyethylene terephthalate, polybutylene terephthalate, polyester, polyacetal, polyamide, polycarbonate, polyimide, polyetheretherketone, polyethersulfone, polyphenylene oxide, polyphenylene sulfide, polyethylene naphthalate, and a mixture thereof.

Also, the first supporting layer 30 may further comprise a conductive material-coating layer having a conductive material and a binder on the surface thereof. The conductive material-coating layer functions to improve the conductivity of an electrode active material layer and reduce electrode resistance, thereby preventing the deterioration of battery performances.

Such conductive material-coating layer is more favorable when applied in a cathode because a cathode active material layer has low conductivity to intensify performance deterioration due to electrode resistance rise, than in an anode whose active material layer has relatively good conductivity and thus is not largely affected by the conductive material-coating layer to exhibit performances similar to conventional anodes.

In the conductive material-coating layer, the conductive material and the binder may be present in a weight ratio of 80:20 to 99:1. The use of large amounts of binder may induce a severe rise in electrode resistance. Therefore, when such a numerical range is satisfied, electrode resistance can be prevented from its severe rise. Also, as mentioned above, since the first supporting layer acts as a buffer which can prevent the release of an electrode active material layer, electrode flexibility is not largely affected by the use of the binder in a relative small amount.

The conductive material may comprise any one selected from the group consisting of carbon black, acetylene black, ketjen black, carbon fiber, carbon nanotube, graphene and a mixture thereof.

The binder may be selected from the group consisting of polyvinylidene fluoride (PVDF), polyvinylidene fluoride-co-hexafluoro propylene, polyvinylidene fluoride-co-trichloroethylene, polybutyl acrylate, polymethyl methacrylate, polyacrylonitrile, polyvinylpyrrolidone, polyvinylacetate, polyethylene-co-vinyl acetate, polyethylene oxide, polyarylate, cellulose acetate, cellulose acetate butyrate, cellulose acetate propionate, cyanoethylpullulan, cyanoethylpolyvinylalcohol, cyanoethylcellulose, cyanoethylsucrose, pullulan, carboxyl methyl cellulose, styrene-butadiene rubber, acrylonitrile-styrene-butadiene copolymer, polyimide and a mixture thereof.

Figure 7:
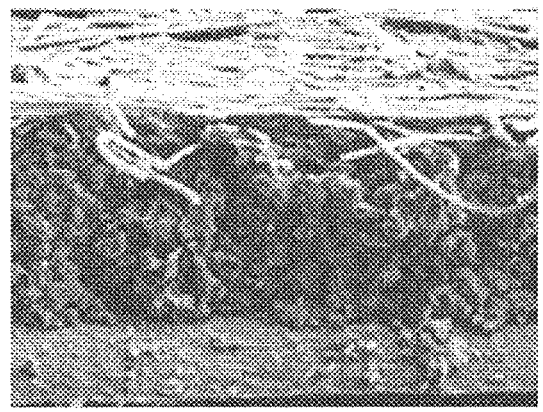
FIG. 7 is an SEM photograph showing a cross-section of a sheet-form electrode for a secondary battery prepared by one embodiment of the present disclosure.

Subsequently, the resultant obtained in step (S2) is compressed to form an electrode active material layer 20 which is adhered between the current collector 10 and the first supporting layer 30 to be integrated with each other (S3). FIG. 7 is an SEM photograph showing a cross-section of an electrode for a secondary battery prepared according to one embodiment of the present disclosure.

Meanwhile, if the electrode active material layer 20 is formed by coating the electrode active material-containing slurry (20') on one surface of the current collector 10, followed by drying, and then the first supporting layer 30 is formed by lamination thereon, the binder component in the slurry (20') for adhering the electrode active material layer 20 with the first supporting layer 30 may be cured, making it difficult to maintain strong adhesion between such two layers.

Also, unlike the preferred preparation method of the present disclosure which uses the first porous supporting layer prepared in advance, if a porous supporting layer is formed by coating a polymer solution on the electrode active material layer, such a porous supporting layer formed by coating the polymer solution has poor mechanical properties than those of the first porous supporting layer of the prevent disclosure, thereby failing to effectively prevent the release of the electrode active material layer.

In contrast, according to the preferred preparation method of the present disclosure, in the case that the first supporting layer 30 is formed on the top of the applied electrode active material-containing slurry (20') before the binder component is cured, and then these are together coated by means of a coating blade 50, thereby forming the electrode active material layer 20 adhered between the current collector 10 and the first supporting layer 30 to be integrated with each other.

Meanwhile, before the step of (S1) or after the step of (S3), the second supporting layer 40 may be further formed on another surface of the current collector by compression. The second supporting layer 40 can inhibit a short circuit of the current collector 10, thereby more improving the flexibility of the current collector 10.

The second supporting layer 40 may be a polymer film which may be made of any one selected from the group consisting of polyolefin, polyester, polyimide, polyamide and a mixture thereof. In the present disclosure, when the electrode for a secondary battery is used as an anode, the electrode active material layer may comprise an active material selected from the group consisting of natural graphite, artificial graphite, or carbonaceous material; lithium-titanium complex oxide (LTO), and metals (Me) including Si, Sn, Li, Zn, Mg, Cd, Ce, Ni and Fe; alloys of the metals; an oxide (MeOx) of the metals; a complex of the metals and carbon; and a mixture thereof, and when the electrode for a secondary battery is used as a cathode, the electrode active material layer may comprise an active material selected from the group consisting of $LiCoO_2$, $LiNiO_2$, $LiMn_2O_4$, $LiCoPO_4$, $LiFePO_4$, $LiNiMnCoO_2$, $LiNi_{1-x-y-z}Co_xM1_yM2_zO_2$ (wherein M1 and M2 are each independently selected from the group consisting of Al, Ni, Co, Fe, Mn, V, Cr, Ti, W, Ta, Mg and Mo, and x, y and z are each independently an atomic fraction of oxide-forming elements, in which $0 \leq x < 0.5$, $0 \leq y < 0.5$, $0 \leq z < 0.5$, and $x+y+z \leq 1$), and a mixture thereof.

In addition, the present disclosure provides a secondary battery comprising a cathode, an anode, a separator interposed between the cathode and the anode, and a non-aqueous electrolyte solution, wherein at least one of the cathode and the anode is the above-mentioned electrode for a secondary battery.

The secondary battery of the present disclosure may be in the general form of stacking, winding or stacking/folding, and also it may be in the particular form of cable type.

Meanwhile, a cable-type secondary battery according to the present disclosure comprises an inner electrode; a separation layer surrounding the outer surface of the inner electrode to prevent a short circuit between electrodes; and an outer electrode spirally wound to surround the outer surface of the separation layer, wherein at least one of the inner electrode and the outer anode is formed from the above-mentioned electrode for a secondary battery according to the present disclosure.

The term 'spirally' used herein refers to represent a helix shape that turns around at a certain area while moving, including general spring forms.

In the present disclosure, the outer electrode may be in the form of a uniaxially extended strip.

Also, the outer electrode may be spirally wound so that it is not overlapped in its width or overlapped in its width. For example, in order to prevent the deterioration of battery performances, the outer electrode may be spirally wound with space within the double length of its width so that it is not overlapped.

Alternatively, the outer electrode may be spirally wound while overlapping in its width. In this case, in order to inhibit an excessive resistance rise within the battery, the sheet-form outer electrode may be spirally wound so that the width of its overlapped part may be within 0.9 folds of the width of the sheet-form outer electrode itself.

The inner electrode may be a hollow structure whose central part is empty.

The inner electrode may comprise one or more electrodes for a secondary battery, the electrodes being spirally wound.

Also, the inner electrode may be provided with a core of inner current collector therein.

The core of inner current collector may be made of carbon nanotube, stainless steel, aluminum, nickel, titanium, sintered carbon, or copper; stainless steel treated with carbon, nickel, titanium or silver on the surface thereof; an aluminum-cadmium alloy; a non-conductive polymer treated with a conductive material on the surface thereof; a conductive polymer.

Alternatively, the inner electrode may be provided with a core for supplying lithium ions, which comprises an electrolyte therein.

The core for supplying lithium ions may comprise a gel polymer electrolyte and a support.

Also, the core for supplying lithium ions may comprise a liquid electrolyte and a porous carrier.

Alternatively, the inner electrode may be provided with a filling core therein.

The filling core may be made of several materials for improving various performances of cable-type batteries, for example polymer resins, rubber and inorganics, besides materials forming the core of inner current collector and the core for supplying lithium ions, and also may have various forms including wire, fiber, powder, mesh and foam.

Figure 8:
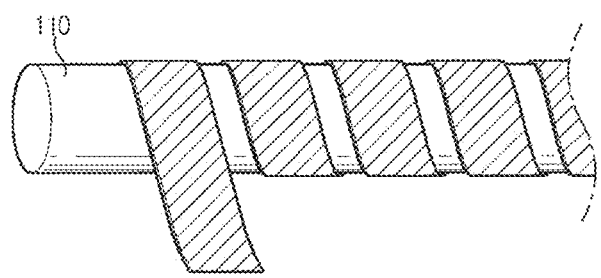
FIG. 8 schematically shows a sheet-form inner electrode being wound on the outer surface of a core for supplying lithium ions in the cable-type secondary battery of the present disclosure.

Meanwhile, FIG. 8 schematically shows a cable-type secondary battery according to the present disclosure in which a sheet-form inner electrode is wound on the outer surface of a core 110 for supplying lithium ions. The sheet-form inner electrode may be applied in cable-type secondary batteries as shown in FIG. 8, and also the sheet-form outer electrode may be similarly wound on the outer surface of a separation layer.

Such a cable-type secondary battery according to the present disclosure comprises a core for supplying lithium ions, which comprises an electrolyte; an inner electrode surrounding the outer surface of the core for supplying lithium ions and comprising a current collector and an electrode active material layer; a separation layer surrounding the outer surface of the inner electrode to prevent a short circuit between electrodes; and an outer electrode spirally wound to surround the outer surface of the separation layer and comprising a current collector and an electrode active material layer, wherein at least one of the inner electrode and the outer anode is formed from the above-mentioned electrode for a secondary battery according to the present disclosure.

The cable-type secondary battery of the present disclosure has a horizontal cross section of a predetermined shape, a linear structure, which extends in the longitudinal direction, and flexibility, so it can freely change in shape. The term 'a predetermined shape' used herein is not limited to any particular shape, and refers to any shape that does not damage the nature of the present disclosure.

Figure 9:
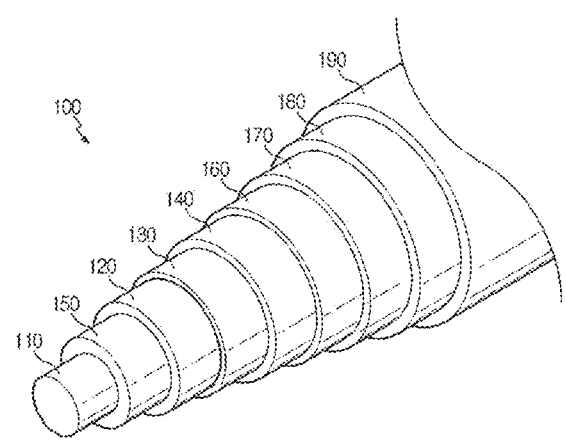
FIG. 9 is an exploded perspective view schematically showing the inside of a cable-type secondary battery according to one embodiment of the present disclosure.

Among cable-type secondary batteries which can be designed by the present disclosure, a cable-type secondary battery 100 in which the above-mentioned electrode for a secondary battery is used as an inner electrode is shown in FIG. 9.

Referring to FIG. 9, the cable-type secondary battery 100 comprises a core 110 for supplying lithium ions, which comprises an electrolyte; an inner electrode surrounding the outer surface of the core 110 for supplying lithium ions; a separation layer 160 surrounding the outer surface of the inner electrode to prevent a short circuit between electrodes; and an outer electrode spirally wound to surround the outer surface of the separation layer 160 and comprising an outer current collector 180 and an outer electrode active material layer 170, wherein the inner electrode comprises an inner current collector 120, an inner electrode active material layer 130 formed on one surface of the inner current collector 120, a first porous supporting layer 140 formed on the top surface of the inner electrode active material layer 130, and a second supporting layer 150 formed on another surface of the inner current collector 120.

As already mentioned above, the sheet-form electrode for a secondary battery according to the present disclosure may be used as the outer electrode, not the inner electrode, or may be used as both of them.

The core 110 for supplying lithium ions comprises an electrolyte which is not particularly limited to its kinds and may be selected from a non-aqueous electrolyte solution using ethylene carbonate (EC), propylene carbonate (PC), butylenes carbonate (BC), vinylene carbonate (VC), diethyl carbonate (DEC), dimethyl carbonate (DMC), ethyl methyl carbonate (EMC), methyl formate (MF), γ-butyrolactone (γ-BL), sulfolane, methyl acetate (MA) or methyl propionate (MP); a gel polymer electrolyte using PEO, PVdF, PVdF-HFP, PMMA, PAN, or PVAc; and a solid electrolyte using PEO, polypropylene oxide (PPO), polyether imine (PEI), polyethylene sulphide (PES), or polyvinyl acetate (PVAc). Also, the electrolyte may further comprise a lithium salt which may be selected from $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium chloroborate, lower aliphatic lithium carbonate, lithium tetraphenylborate, and a mixture thereof. The core 110 for supplying lithium ions may consist of only an electrolyte, and especially a liquid electrolyte may be formed by using a porous carrier.

In the present disclosure, the inner electrode may be an anode or a cathode, and the outer electrode may be a cathode or an anode corresponding to the inner electrode.

Electrode active materials which may be used in the anode and the cathode are the same as those which are mentioned above.

Meanwhile, the separation layer may be an electrolyte layer or a separator.

The electrolyte layer serving as an ion channel may be made of a gel-type polymer electrolyte using PEO, PVdF, PVdF-HFP, PMMA, PAN or PVAC, or a solid electrolyte using PEO, polypropylene oxide (PPO), polyethylene imine (PEI), polyethylene sulfide (PES) or polyvinyl acetate (PVAc). The matrix of the solid electrolyte is preferably formed using a polymer or a ceramic glass as the backbone. In the case of typical polymer electrolytes, the ions move very slowly in terms of reaction rate, even when the ionic conductivity is satisfied. Thus, the gel-type polymer electrolyte which facilitates the movement of ions is preferably used compared to the solid electrolyte. The gel-type polymer electrolyte has poor mechanical properties and thus may comprise a support to improve poor mechanical properties, and the support may be a porous-structured support or a cross-linked polymer. The electrolyte layer of the present invention can serve as a separator, and thus an additional separator may be omitted.

In the present disclosure, the electrolyte layer may further comprise a lithium salt. The lithium salt can improve an ionic conductivity and response time. Non-limiting examples of the lithium salt may include $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium chloroborate, lower aliphatic lithium carbonate, and lithium tetraphenylborate.

Examples of the separator may include, but is not limited to, a porous polymer substrate made of a polyolefin-based polymer selected from the group consisting of ethylene homopolymers, propylene homopolymers, ethylene-butene copolymers, ethylene-hexene copolymers, and ethylene-methacrylate copolymers; a porous polymer substrate made of a polymer selected from the group consisting of polyesters, polyacetals, polyamides, polycarbonates, polyimides, polyether ether ketones, polyether sulfones, polyphenylene oxides, polyphenylene sulfides and polyethylene naphthalates; a porous substrate made of a mixture of inorganic particles and a binder polymer; or a separator having a porous coating layer formed on at least one surface of the porous polymer substrate and comprising inorganic particles and a binder polymer.

In the porous coating layer formed from inorganic particles and a binder polymer, the inorganic particles are bound to each other by the binder polymer (i.e., the binder polymer connects and immobilizes the inorganic particles), and also the porous coating layer maintains the state of binding with the first supporting layer by the binder polymer, In such a porous coating layer, the inorganic particles are filled in contact with each other, from which interstitial volumes are formed between the inorganic particles. The interstitial volumes between the inorganic particles become empty spaces to form pores.

Among these, in order for the lithium ions of the core for supplying lithium ions to be transferred to the outer electrode, it is preferred to use a non-woven fabric separator corresponding to the porous polymer substrate made of a polymer selected from the group consisting of polyesters, polyacetals, polyamides, polycarbonates, polyimides, polyether ether ketones, polyether sulfones, polyphenylene oxides, polyphenylene sulfides and polyethylene naphthalates.

Also, the cable-type secondary battery of the present disclosure has a protection coating 190. The protection coating acts as an insulator and is formed to surround the outer current collector, thereby protecting the electrodes against moisture in the air and external impacts. The protection coating 190 may be made of conventional polymer resins having a moisture-blocking layer. The moisture-blocking layer may be made of aluminum or a liquid-crystalline polymer which have good water-blocking ability, and the polymer resins may be PET, PVC, HDPE or epoxy resins.

Meanwhile, a cable-type secondary battery according to yet still another aspect of the present invention comprises two or more inner electrodes arranged in parallel to each other; a separation layer surrounding the outer surface of the inner electrodes to prevent a short circuit between electrodes; and an outer electrode spirally wound to surround the outer surface of the separation layer, wherein at least one of the inner electrode and the outer anode is formed from the above-mentioned electrode for a secondary battery according to the present disclosure.

Further, the present disclosure provides a cable-type secondary battery, comprising: two or more cores for supplying lithium ions, which comprise an electrolyte; two or more inner electrodes arranged in parallel to each other, each inner electrode surrounding the outer surface of each core for supplying lithium ions and comprising a current collector and an electrode active material layer; a separation layer surrounding the outer surface of the inner electrodes to prevent a short circuit between electrodes; and an outer electrode spirally wound to surround the outer surface of the separation layer and comprising a current collector and an electrode active material layer, wherein at least one of the inner electrode and the outer anode is formed from the above-mentioned electrode for a secondary battery according to the present disclosure.

Figure 10:
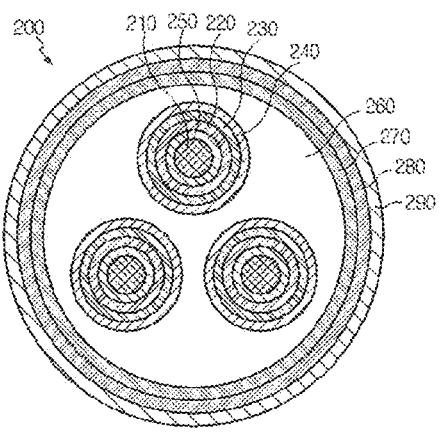
FIG. 10 shows a cross-section of a cable-type secondary battery having a plurality of inner electrodes according to the present disclosure.

Among cable-type secondary batteries having two or more inner electrodes which can be designed by the present disclosure, a cable-type secondary battery 200 in which the above-mentioned electrode for a secondary battery is used as an inner electrode is shown in FIG. 10.

Referring to FIG. 10, the cable-type secondary battery 200 comprises two or more cores 210 for supplying lithium ions, which comprise an electrolyte; two or more inner electrodes arranged in parallel to each other, each inner electrode surrounding the outer surface of each core for supplying lithium ions; a separation layer 260 surrounding the outer surface of the inner electrodes to prevent a short circuit between electrodes; and an outer electrode spirally wound to surround the outer surface of the separation layer 260 and comprising an outer current collector 280 and an outer electrode active material layer 270, wherein each inner electrode comprises an inner current collector 220, an inner electrode active material layer 230 formed on one surface of the inner current collector 220, a first porous supporting layer 240 formed on the top surface of the inner electrode active material layer 230, and a second supporting layer 250 formed on another surface of the inner current collector 220.

As already mentioned above, the sheet-form electrode for a secondary battery according to the present disclosure may be used as the outer electrode, not the inner electrode, or may be used as both of them.

In the cable-type secondary battery 200 which has a plurality of inner electrodes, the number of the inner electrodes can be adjusted to control the loading amount of the electrode active material layers as well as battery capacity, and a probability of short circuit can be prevented owing to the presence of multiple electrodes.

Hereinafter, the present invention will be described in detail through specific examples. However, the description proposed herein is just a preferable example for the purpose of illustrations only, not intended to limit the scope of the invention, so it should be understood that the examples are provided for a more definite explanation to an ordinary person skilled in the art.

Example

(1) Preparation of Anode

A polyethylene film was compressed on one surface of a sheet-form current collector made of copper, to form a second supporting layer.

Next, an anode active material-containing slurry was obtained by dispersing 70 wt % of graphite as an anode active material, 5 wt % of Denka black as a conductive material and 25 wt % of PVdF as a binder in NMP used as a solvent, Subsequently, the slurry was applied on another surface of the sheet-form current collector, and then a PET non-woven fabric for composing a first porous supporting layer is placed on the slurry, followed by compression, to obtain a laminate having the second supporting layer, the current collector, a layer of the anode active material-containing slurry and the first supporting layer in order. Thereby, a sheet-form anode for a secondary battery was prepared.

(2) Preparation of Coin-Type Half-Cell

A polyethylene separator was interposed between the sheet-form anode prepared in step (1) and a cathode consisting of a lithium foil, to obtain an electrode assembly. The electrode assembly was put in a battery case, to which 1M $LiPF_6$ of non-aqueous electrolyte solution was introduced, the electrolyte solution being obtained by mixing ethylene carbonate (EC) and diethyl carbonate (DEC) in a volume ratio of 1:2 and adding $LiPF_6$ to the resulting non-aqueous solvent until the concentration of $LiPF_6$ became 1M. Thereby, a coin-type half-cell was prepared.

Comparative Example

(1) Preparation of Anode

A sheet-form current collector made of copper was coated with an anode active material-containing slurry obtained by dispersing 70 wt % of graphite as an anode active material, 5 wt % of Denka black as a conductive material and 25 wt % of PVdF as a binder in NMP, followed by drying, to prepared an anode.

(2) Preparation of Coin-Type Half-Cell

The procedures of step (2) of the Example were repeated except that the cathode prepared in step (1) of Comparative Example 1 was used, to prepare a coin-type half-cell.
Folding Test of Anode The cathodes prepared in the Example and the Comparative Example were folded in half, and the appearances thereof were observed.

Figure 11:
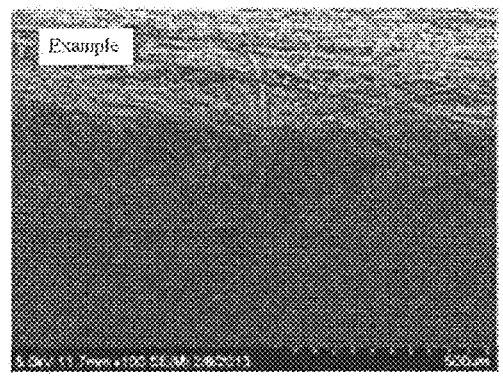
FIG. 11 is a photograph showing a sheet-form electrode for a secondary battery prepared in the Example of the present disclosure, after the electrode is folded in half.
Figure 12:
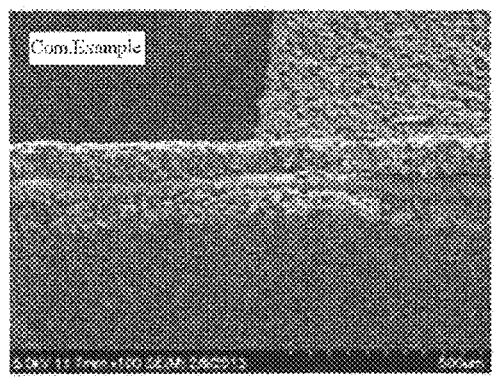
FIG. 12 is a photograph showing a sheet-form electrode for a secondary battery prepared in Comparative Example of the present disclosure, after the electrode is folded in half.

FIGS. 11 and 12 are photographs showing the appearances of the sheet-form electrodes prepared in the Example and the Comparative Example, respectively, after folding them in half.

As can be seen from such photographs, the electrode of the Comparative Example was broken and severely cracked. In contrast, the electrode of the Example was slightly cracked to be mitigated from crack generation, which is resulted from the fact that the electrode active layer thereof was well held by the first supporting layer made of a PET non-woven fabric. From this, the anode of the Example was confirmed to have surprisingly improved flexibility.

Evaluation of Charge/Discharge Characteristics

The half-cells prepared in the Example and the Comparative Example were each evaluated for their charge/discharge characteristics. The batteries were charged with a current density of 0.5 C up to 5 mV at constant current and then continuously charged with 5 mV at constant voltage, and the charging process was completed when the current density reached 0.005 C. Then, batteries were discharged with a current density of 0.5 C up to 1.5 V at constant current. The charging/discharging was repeated 25 times under the same conditions.

Figure 13:
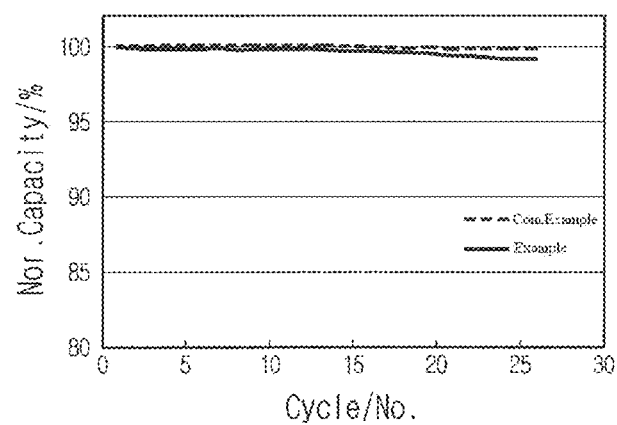
FIG. 13 is a graph showing the life characteristics of coin-type half cells prepared in the Example and the Comparative Examples of the present disclosure.

FIG. 13 shows the life characteristics of coin-type half cells prepared in the Example and the Comparative Example. The cell of the Example exhibited battery performances almost similar to that of the Comparative Example, even though its life characteristic was reduced by about 1%. From this, the introduction of the first and second supporting layers can provide surprisingly improved electrode flexibility.

APPLICABILITY TO THE INDUSTRY

The present disclosure has been described in detail. However, it should be understood that the detailed description and specific examples, while indicating preferred embodiments of the disclosure, are given by way of illustration only, since various changes and modifications within the spirit and scope of the disclosure will become apparent to those skilled in the art from this detailed description.

What is claimed is:

1. A sheet-form electrode for a secondary battery, comprising:
   a current collector;
   an electrode active material layer formed on one surface of the current collector; and
   a first porous supporting layer formed on the electrode active material layer,
   wherein the sheet-form electrode is formed in a substantially helical shape.

2. The electrode for a secondary battery according to claim 1, wherein the current collector is made of stainless steel, aluminum, nickel, titanium, sintered carbon, or copper; stainless steel treated with carbon, nickel, titanium or silver on a surface thereof; an aluminum-cadmium alloy; a non-conductive polymer treated with a conductive material on a surface thereof; a conductive polymer; a metal paste comprising metal powders of Ni, Al, Au, Ag, Pd/Ag, Cr, Ta, Cu, Ba or ITO; or a carbon paste comprising carbon powders of graphite, carbon black or carbon nanotube.

3. The electrode for a secondary battery according to claim 1, wherein the current collector is in the form of a mesh.

4. The electrode for a secondary battery according to claim 1, wherein the current collector further comprises a primer coating layer consisting of a conductive material and a binder.

5. The electrode for a secondary battery according to claim 4, wherein the conductive material comprises any one selected from the group consisting of carbon black, acetylene black, ketjen black, carbon fiber, carbon nanotube, graphene and a mixture thereof.

6. The electrode for a secondary battery according to claim 4, wherein the binder is selected from the group consisting of polyvinylidene fluoride (PVDF), polyvinylidene fluoride-co-hexafluoro propylene, polyvinylidene fluoride-co-trichloro-ethylene, polybutyl acrylate, polymethyl methacrylate, polyacrylonitrile, polyvinylpyrrolidone, polyvinylacetate, polyethylene-co-vinyl acetate, polyethylene oxide, polyarylate, cellulose acetate, cellulose acetate butyrate, cellulose acetate propionate, cyanoethylpullulan, cyanoethylpolyvinylalcohol, cyanoethylcellulose, cyanoethylsucrose, pullulan, carboxyl methyl cellulose, styrene-butadiene rubber, acrylonitrile-styrene-butadiene copolymer, polyimide and a mixture thereof.

7. The electrode for a secondary battery according to claim 1, wherein the current collector has a plurality of recesses on at least one surface thereof.

8. The electrode for a secondary battery according to claim 7, wherein the plurality of recesses are continuously patterned or intermittently patterned recesses.

9. The electrode for a secondary battery according to claim 8, wherein the continuously patterned recesses are formed with spacing apart from each other in a longitudinal direction.

10. The electrode for a secondary battery according to claim 8, wherein the intermittently patterned recesses are formed by a plurality of holes.

11. The electrode for a secondary battery according to claim 10, wherein each of the plurality of holes has a circular or polygonal shape.

12. The electrode for a secondary battery according to claim 1, wherein the first supporting layer is a mesh-form porous membrane or a non-woven fabric.

13. The electrode for a secondary battery according to claim 1, wherein the first supporting layer is made of any one selected from the group consisting of high-density polyethylene, low-density polyethylene, linear low-density polyethylene, ultra-high molecular weight polyethylene, polypropylene, polyethylene terephthalate, polybutylene terephthalate, polyester, polyacetal, polyamide, polycarbonate, polyimide, polyetheretherketone, polyethersulfone, polyphenylene oxide, polyphenylene sulfide, polyethylene naphthalate, and a mixture thereof.

14. The electrode for a secondary battery according to claim 1, wherein the first supporting layer further comprises a conductive material-coating layer having a conductive material and a binder thereon.

15. The electrode for a secondary battery according to claim 14, wherein the conductive material of the conductive material-coating layer and the binder of the conductive material-coating layer are present in a weight ratio of 80:20 to 99:1 in the conductive material-coating layer.

16. The electrode for a secondary battery according to claim 14, wherein the conductive material of the conductive material-coating layer comprises any one selected from the group consisting of carbon black, acetylene black, ketjen black, carbon fiber, carbon nanotube, graphene and a mixture thereof.

17. The electrode for a secondary battery according to claim 14, wherein the binder of the conductive material-coating layer is selected from the group consisting of polyvinylidene fluoride (PVDF), polyvinylidene fluoride-co-hexafluoro propylene, polyvinylidene fluoride-co-trichloroethylene, polybutyl acrylate, polymethyl methacrylate, polyacrylonitrile, polyvinylpyrrolidone, polyvinylacetate, polyethylene-co-vinyl acetate, polyethylene oxide, polyarylate, cellulose acetate, cellulose acetate butyrate, cellulose acetate propionate, cyanoethylpullulan, cyanoethylpolyvinylalcohol, cyanoethylcellulose, cyanoethylsucrose, pullulan, carboxyl methyl cellulose, styrene-butadiene rubber, acrylonitrile-styrene-butadiene copolymer, polyimide and a mixture thereof.

18. The electrode for a secondary battery according to claim 1, wherein the first porous supporting layer further comprises a porous coating layer comprising a mixture of inorganic particles and a binder polymer thereon.

19. The electrode for a secondary battery according to claim 1, wherein when the electrode for a secondary battery is used as an anode, the electrode active material layer comprises an active material selected from the group consisting of natural graphite, artificial graphite, or carbonaceous material; lithium-titanium complex oxide (LTO), and metals (Me) including Si, Sn, Li, Zn, Mg, Cd, Ce, Ni and Fe; alloys of the metals; an oxide (MeOx) of the metals; a complex of the metals and carbon; and a mixture thereof, and when the electrode for a secondary battery is used as a cathode, the electrode active material layer comprises an active material selected from the group consisting of $LiCoO_2$, $LiNiO_2$, $LiMn_2O_4$, $LiCoPO_4$, $LiFePO_4$, $LiNiMnCoO_2$, $LiNi_{1-x-y-z}Co_xM1_yM2_zO_2$ (wherein M1 and M2 are each independently selected from the group consisting of Al, Ni, Co, Fe, Mn, V, Cr, Ti, W, Ta, Mg and Mo, and x, y and z are each independently an atomic fraction of oxide-forming elements, in which $0 \le x < 0.5$, $0 \le y < 0.5$, $0 \le z < 0.5$, and $x+y+z \le 1$), and a mixture thereof.

20. A secondary battery comprising a cathode, an anode, a separator interposed between the cathode and the anode, and a non-aqueous electrolyte solution,
wherein at least one of the cathode and the anode is the electrode for a secondary battery according to claim 1.

21. The secondary battery according to claim 20, which is the form of a cable.

22. The electrode for a secondary battery according to claim 1, which further comprises a second supporting layer formed on another surface of the current collector.

23. The electrode for a secondary battery according to claim 22, wherein the second supporting layer is a polymer film.

24. The electrode for a secondary battery according to claim 23, wherein the polymer film is made of any one selected from the group consisting of polyolefin, polyester, polyimide, polyamide and a mixture thereof.

25. A method of preparing a sheet-form electrode for a secondary battery, comprising
(S1) applying a slurry containing an electrode active material on one surface of a current collector;
(S2) forming a first porous supporting layer on the applied electrode active material slurry;
(S3) compressing the resultant obtained in step (S2) to form an electrode active material layer which is adhered between the current collector and the first porous supporting layer to be integrated with each other; and
(S4) forming the sheet-form electrode into a substantially helical shape.

26. The method according to claim 25, wherein the electrode active material slurry comprises a binder.

27. The method according to claim 26, wherein in the step of (S2), before the binder is cured, the first porous supporting layer is formed on the applied electrode active material slurry.

28. The method according to claim 26, wherein in the step of (S3), before the binder is cured, the resultant obtained in step (S2) is compressed by a coating blade to form an electrode active material layer which is adhered between the current collector and the first porous supporting layer to be integrated with each other.

29. The method according to claim 25, wherein before the step of (S1) or after the step of (S3), a second supporting layer is further formed on another surface of the current collector by compression.

30. A cable-type secondary battery, comprising:
a core for supplying lithium ions, which comprises an electrolyte;
an inner electrode surrounding an outer surface of the core for supplying lithium ions and comprising a current collector and an electrode active material layer;

a separation layer surrounding an outer surface of the inner electrode to prevent a short circuit between electrodes; and an outer electrode helically wound to surround an outer surface of the separation layer and comprising a current collector and an electrode active material layer, wherein at least one of the inner electrode and the outer electrode is a sheet-form electrode for a secondary battery including the respective current collector, the respective electrode active material layer formed on one surface of the respective current collector, and a first porous supporting layer formed on the respective electrode active material layer.

* * * * *